United States Patent
Telinge et al.

(10) Patent No.: US 10,962,649 B2
(45) Date of Patent: Mar. 30, 2021

(54) METHOD AND SYSTEM FOR HANDLING BLIND SECTORS OF SCANNING LAYERS OF REDUNDANT SENSORS IN A VEHICLE

(71) Applicant: EASYMILE, Toulouse (FR)

(72) Inventors: Arnaud Telinge, Toulouse (FR); Christophe Delord, Saint Sulpice la Pointe (FR)

(73) Assignee: EASYMILE, Toulouse (FR)

( * ) Notice: Subject to any disclaimer, the term of this patent is extended or adjusted under 35 U.S.C. 154(b) by 0 days.

(21) Appl. No.: 16/722,698

(22) Filed: Dec. 20, 2019

(65) Prior Publication Data
US 2020/0200911 A1 Jun. 25, 2020

(30) Foreign Application Priority Data

Dec. 21, 2018 (EP) .................................. 18315052

(51) Int. Cl.
| | |
|---|---|
| *B60Q 1/00* | (2006.01) |
| *G01S 17/931* | (2020.01) |
| *B60W 50/14* | (2020.01) |
| *G01S 7/481* | (2006.01) |
| *G01S 7/497* | (2006.01) |

(52) U.S. Cl.
CPC ............ *G01S 17/931* (2020.01); *B60W 50/14* (2013.01); *G01S 7/4815* (2013.01); *G01S 7/4817* (2013.01); *G01S 7/497* (2013.01); *G01S 2007/4975* (2013.01)

(58) Field of Classification Search
CPC .... G01S 17/931; G01S 7/4815; G01S 7/4817; G01S 7/497; G01S 2007/4975; G01S 17/42; G01S 17/87; G01S 15/878; G01S 7/529; G01S 15/003; G01S 15/87; G01S 2013/93275; G01S 2013/9314; G01S 2015/938; B60W 50/14; G08G 1/16
USPC ......................... 340/435, 436, 438, 903, 904
See application file for complete search history.

(56) References Cited

U.S. PATENT DOCUMENTS

| | | | | |
|---|---|---|---|---|
| 2010/0245065 | A1* | 9/2010 | Harada | G01S 7/529 340/435 |
| 2011/0241857 | A1* | 10/2011 | Brandenburger | G01S 15/931 340/435 |
| 2013/0141581 | A1* | 6/2013 | Mitsuta | H04N 7/002 348/148 |

(Continued)

FOREIGN PATENT DOCUMENTS

| | | |
|---|---|---|
| DE | 102009028300 A1 | 2/2011 |
| DE | 102016111615 B3 | 4/2017 |
| EP | 3404638 A1 | 11/2018 |

OTHER PUBLICATIONS

Extended European Search Report with regard to the counterpart EP Patent Application No. 18315052.3 dated Jun. 7, 2019.

(Continued)

*Primary Examiner* — Anh V La
(74) *Attorney, Agent, or Firm* — BCF LLP

(57) ABSTRACT

A method and system is devised for handling blind sectors in redundant sensors of a vehicle. Blind sectors of the redundant sensors are detected, and if they qualify as large blind sectors, any intersection of such large blind sectors that lies within a monitored zone extending from the vehicle yields a critical signal sent to the driver of the vehicle, or to the navigation system in case of an autonomous vehicle.

18 Claims, 7 Drawing Sheets

(56) References Cited

U.S. PATENT DOCUMENTS

| | | | |
|---|---|---|---|
| 2013/0314221 A1* | 11/2013 | Taylor | G06T 7/11 |
| | | | 340/435 |
| 2015/0278610 A1* | 10/2015 | Renner | G06K 9/209 |
| | | | 340/435 |
| 2018/0188362 A1 | 7/2018 | Fujita | |
| 2019/0204845 A1* | 7/2019 | Grossman | G01S 7/4813 |

OTHER PUBLICATIONS

English Abstract for DE102009028300 retrieved on Espacenet on Dec. 16, 2019.
English Abstract for DE102016111615 retrieved on Espacenet on Dec. 16, 2019.
EPO Communication with regard to the counterpart EP Patent Application No. 18315052.3 dated Jan. 11, 2021.

* cited by examiner

METHOD AND SYSTEM FOR HANDLING BLIND SECTORS OF SCANNING LAYERS OF REDUNDANT SENSORS IN A VEHICLE

CROSS-REFERENCE

The present application claims priority to European Patent Application No. 18315052.3, entitled "METHOD AND SYSTEM FOR HANDLING BLIND SECTORS OF SCANNING LAYERS OF REDUNDANT SENSORS IN A VEHICLE," filed on Dec. 21, 2018, the entirety of which is incorporated herein by reference.

FIELD

The present technology relates to handling obstructive elements affecting redundant sensors mounted on a vehicle to assist with its navigation.

BACKGROUND

Today's vehicles, including autonomous or driverless ones, commonly use sensors mounted on the vehicle to detect possible obstacles and allow avoidance behavior, such as a complete stop or a trajectory change, so as to navigate safely through environments. «Sensor» as used herein, designates an opto-electronic apparatus, such as a LIDAR sensor, based on the principle of emitting a lightwave beam, catching the reflections of objects in the field of view, and providing distance information about reflecting objects, with a given scanning frequency in one or multiple scanning layers.

Sensors are susceptible to obstructive elements such as dirt, dead bugs, droppings, soap residues or water spots, or even cracks in the protective housing for the opto-electronic, with such protective housing being an integral part of the sensors, or being added around and about them by protective elements of the vehicle (glass or other material that is transparent to the optical beam used by the sensor). Such obstructive elements disrupt the accuracy of the sensors by effectively creating blind sectors in the scanning layer(s), and putting navigation of the vehicle at risk. Systems have been devised to help increasing availability of reliable data from sensors by checking the conditions of their protective housing, and/or cleaning it as the case may be, and keeping sensors free of obstructive elements as long and as often as possible. However, there remains periods of time when this is not the case.

To increase safety and availability, redundancy in sensors has been introduced, with «redundant sensors» defined as sensors mounted on the vehicle, and being redundant relatively to each other, i.e. sharing at least one region of overlap between scanning layers, with that region containing a monitored zone extending from the vehicle. This includes sensors not having scanning layers in the same plane (for example with sensors mounted at different heights of the vehicle), to the extent there is an overlap region when such layers and monitored zone are all projected orthogonally on a substantially horizontal plane within the vehicle's reference system.

«Monitored zone» as used herein, designates a zone extending from the vehicle, designed to detect every obstacle onto and close to the vehicle trajectory that is creating a risk of collision. The maximum size of the monitored zone is such that the monitored zone is contained entirely in the region of overlap between scanning layers. The actual size within that limit may be either fixed, or dynamically calculated as a function of the speed, steering and mechanical characteristics of the vehicle (shape of the vehicle, maximal deceleration, brake reaction time) or latencies of the software onboard the vehicle (for example software that is controlling an autonomous or driverless vehicle), or a combination of one or more of these parameters. For example when the vehicle is stopped, the monitored zone has no surface. The person skilled in the art will recognize that the concept of dynamic calculation of a monitored zone, «protected field» or «monitoring range» within the boundaries of the field of view of a sensor, based in particular on the motion vector of a vehicle on which the sensor is mounted, is known in the prior art. The person skilled in the art will also recognize that a dynamically calculated monitored zone meeting the criteria of the foregoing definition, may be arrived at in many different technical ways.

However, even with redundant sensors, there remains a risk that both sensors be simultaneously affected by obstruction and blind sectors leading to an unsafe blind area in the monitored zone. There is therefore a need for a method and system for improved handling of blind sectors of redundant sensors in a vehicle.

SUMMARY

Various implementations of the present technology provide a method of handling blind sectors in scanning layers of at least two, a first and a second, redundant sensors being mounted on a vehicle from which a monitored zone extends, such redundant sensors each providing a cloud of points representative of objects present in their respective fields of view, the method comprising the steps of:

detecting the formation of at least one large blind sector in at least one of the scanning layers of each of redundant sensors;

calculating an overlap between each detected large blind sector in any scanning layer of the first redundant sensor and each detected large blind sector in any scanning layer of the second redundant sensor; and if the overlap lies within the monitored zone, sending a critical signal to the vehicle.

In one embodiment of the present technology, the method further includes the steps of:

detecting for each of the redundant sensors that a density of abnormal cloud points exceeds a first threshold indicative of obstructive elements that are in the vicinity of the redundant sensor's protective housing; and detecting for each of the redundant sensors that the angle determined by the size of the cloud of abnormal cloud points exceeds a second threshold.

In another embodiment of the present technology, the method further includes the steps of, upon receiving the critical signal, stopping the vehicle in emergency.

In another embodiment of the present technology, the method further includes the steps of, upon receiving the critical signal, changing the speed and/or steering of the vehicle so as to remove the overlap from the monitored zone.

In another embodiment of the present technology, the method further includes the steps of, upon receiving the critical signal, sending a signal to a driver of the vehicle requiring immediate attention.

In another embodiment of the present technology, the method further includes the steps of, upon detecting for any one of the redundant sensors that the density of abnormal cloud points exceeds the first threshold, and the size of the cloud of abnormal cloud points does not exceed the second threshold, sending a warning signal to the vehicle about the one sensor.

In another embodiment of the present technology, the method further includes the steps of, upon detecting for any one of the redundant sensors that the density of abnormal cloud points exceeds the first threshold, and the size of the cloud of abnormal cloud points exceeds the second threshold, sending an alarm signal to the vehicle about the one sensor.

In another embodiment of the present technology, the method further includes the steps of, if scanning layers of the first and second redundant sensors are not in the same plane, or are not parallel, orthogonally projecting scanning layers on a substantially horizontal plane within the vehicle's reference system.

In another embodiment of the present technology, the method further includes the steps of, if n redundant sensors are mounted on the vehicle, with n being equal or superior to 3, calculating the overlap simultaneously for all n redundant sensors.

In another embodiment of the present technology, the first threshold and/or the second threshold are adapted to each one of the redundant sensors.

Various implementations of the present technology also provide a system of handling blind sectors in scanning layers of redundant sensors in a vehicle, comprising:

at least two, a first and a second, redundant sensors mounted on the vehicle; and a safety critical system configured to:
receive from each redundant sensor a cloud of points representative of objects present in their respective fields of view;
detect the formation of at least one large blind sector in at least one of the scanning layers of each redundant sensors;
calculate an overlap between each detected large blind sector in any scanning layer of the first redundant sensor and each detected large blind sector in any scanning layer of the second redundant sensor; and
if the overlap lies within a monitored zone extending from the vehicle, send a critical signal to the vehicle.

In one embodiment of the present technology, the safety critical system is further configured to:

detect for each of the redundant sensors a density of abnormal cloud points above a first threshold indicative of obstructive elements that are in the vicinity of the redundant sensor's protective housing; and detect for each of the redundant sensors that the angle determined by the size of the cloud of abnormal cloud points exceeds a second threshold.

In another embodiment of the present technology, the system further comprises a vehicle traction and steering actuators and sensors system configured to, upon receiving the critical signal, stopping the vehicle in emergency.

In yet another embodiment of the present technology, the system further comprises a vehicle traction and steering actuators and sensors system configured to, upon receiving the critical signal, changing the speed and/or steering of the vehicle so as to remove the overlap from the monitored zone.

In yet another embodiment of the present technology, the safety critical system is further configured to:

detect for any one of the redundant sensors that the density of abnormal cloud points exceeds the first threshold, and the size of the cloud of abnormal cloud points does not exceed the second threshold; and send a warning signal to the vehicle about the one sensor.

In yet another embodiment of the present technology, the safety critical system is further configured to:

detect for any one of the redundant sensors that the density of abnormal cloud points exceeds the first threshold, and the size of the cloud of abnormal cloud points exceeds the second threshold; and send an alarm signal to the vehicle about the one sensor.

In yet another embodiment of the present technology, the safety critical system is further configured to, when scanning layers of the first and second redundant sensors are not in the same plane, or are not parallel, orthogonally project scanning layers on a substantially horizontal plane within the vehicle's reference system, prior to calculating an overlap between each detected large blind sector in any scanning layer of the first redundant sensor and each detected large blind sector in any scanning layer of the second redundant sensor.

In yet another embodiment of the present technology, n redundant sensors are mounted on the vehicle, with n being equal or superior to 3, and the safety critical system is further configured to calculate the overlap simultaneously for all n redundant sensors.

In yet another embodiment of the present technology, the safety critical system is further configured to adapt the first threshold and/or the second threshold to each one of the redundant sensors.

In yet another embodiment of the present technology, the system further comprises a navigation system configured to:

calculate the monitored zone extending from the vehicle; and communicate the calculated monitored zone to the safety critical system; with the safety critical system being further configured to receive the calculated monitored zone.

In yet another embodiment of the present technology, the safety critical system is further configured to calculate the monitored zone extending from the vehicle.

Implementations of the present technology each have at least one of the above mentioned object and/or aspects, but do not necessarily have all of them.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale. Finally, elements that are identical from one drawing to the other bear the same numeral reference across drawings.

DETAILED DESCRIPTION

Figure 1:
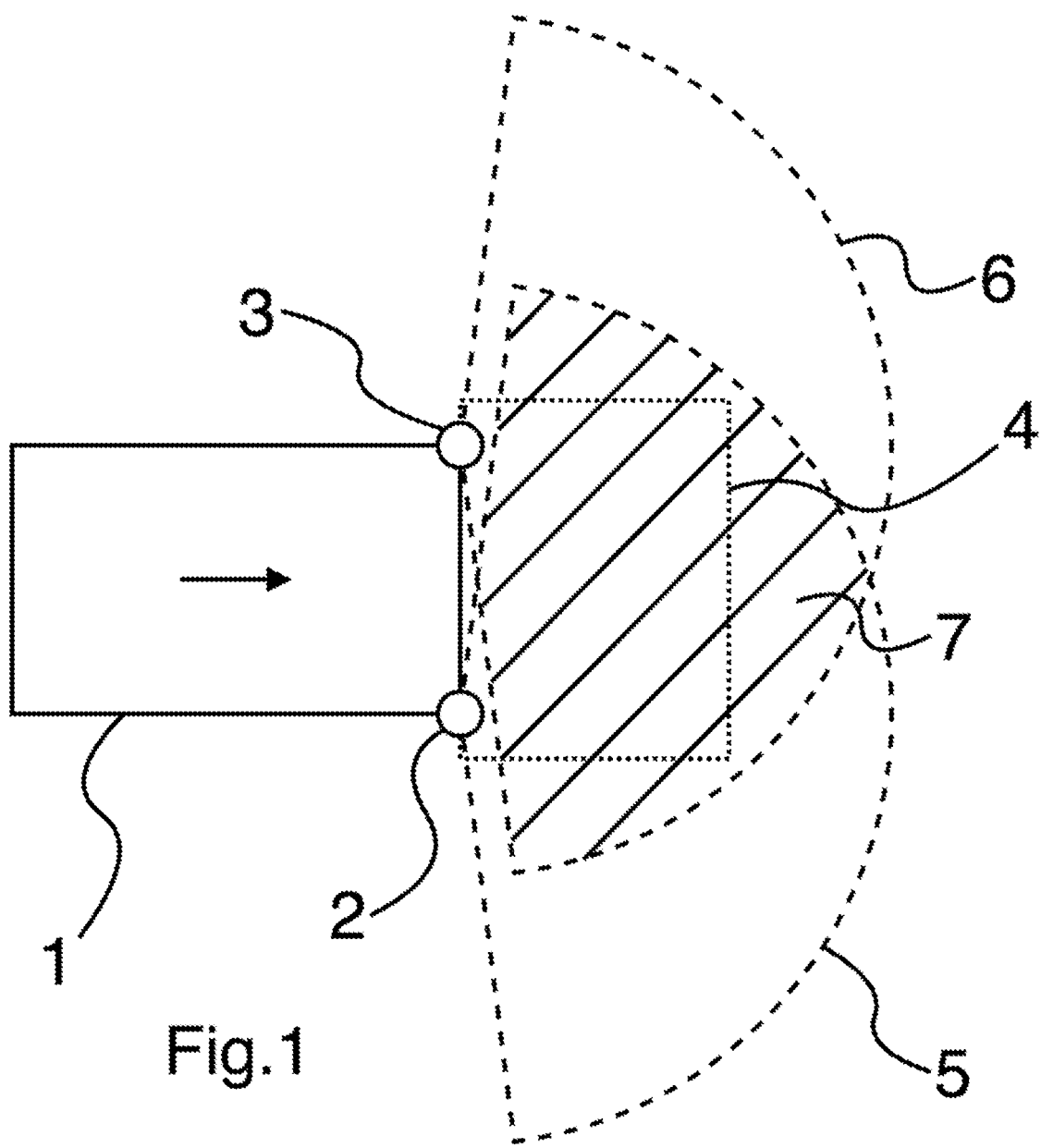
FIG. 1 is a top view of a vehicle equipped with two redundant sensors in a substantially straight line trajectory.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). In the aforementioned, explicit use of the term a «processor» should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that «module» may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 is a top view of a vehicle equipped with two redundant sensors in a substantially straight line trajectory. Vehicle 1 moves in the direction of the arrow. It is equipped with two redundant sensors 2 and 3 having respective scanning layers 5 and 6 toward the front of vehicle 1. A monitored zone 4 is defined around the vehicle 1, either fixed or adapted in shape and size based on speed, steering and mechanical characteristics of the vehicle 1 (shape of the vehicle, maximal deceleration, brake reaction time . . . ) as well as latencies of software onboard vehicle 1. Sensors 2 and 3 are redundant in that their scanning layers 5 and 6 overlap in a region 7.

Figure 2:
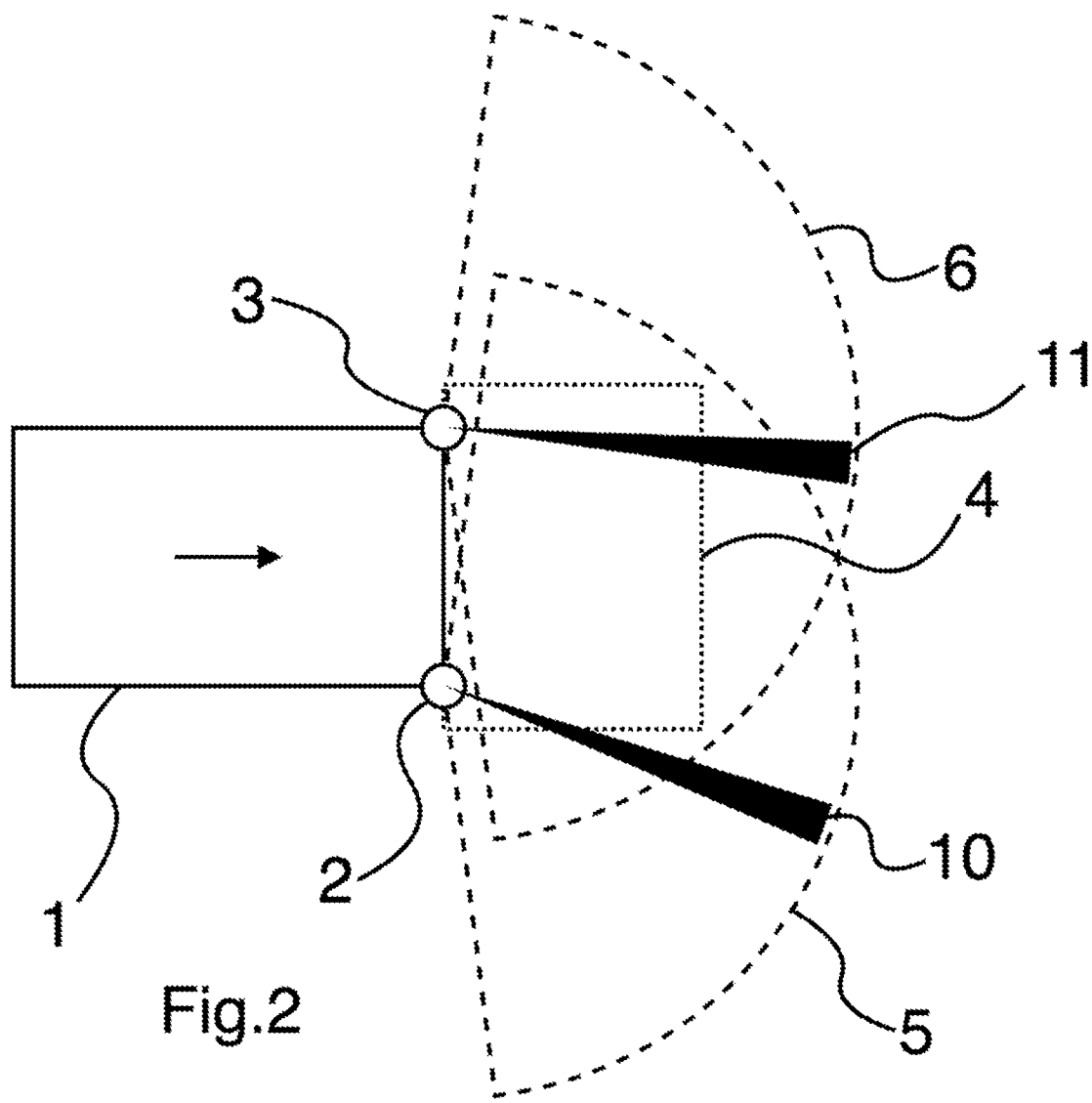
FIG. 2 illustrates the case of non overlapping blind sectors between two redundant sensors.

A blind sector in either redundant sensor 2 or 3 may be represented as a slice in the top view of either scanning layer 5 or 6, where failure of the protective housing or the redundant sensor itself prevents the lightwave beam from going through and creating a gap in the horizontal field of view. When each of redundant sensors 2 and 3 have a blind sector, several possibilities occur:

FIG. 2 illustrates the case of non overlapping blind sectors between two redundant sensors. Each of redundant sensors 2 and 3 has a gap in its horizontal field of view, respectively blind sectors 10 and 11. The two blind sectors do not overlap. In this case, redundancy allows to send a warning or alarm signal, depending on the opening of the angle of blind sectors 10 and 11, that the redundant sensors need to be cleaned, but the vehicle 1 can continue operating safely.

Figure 3:
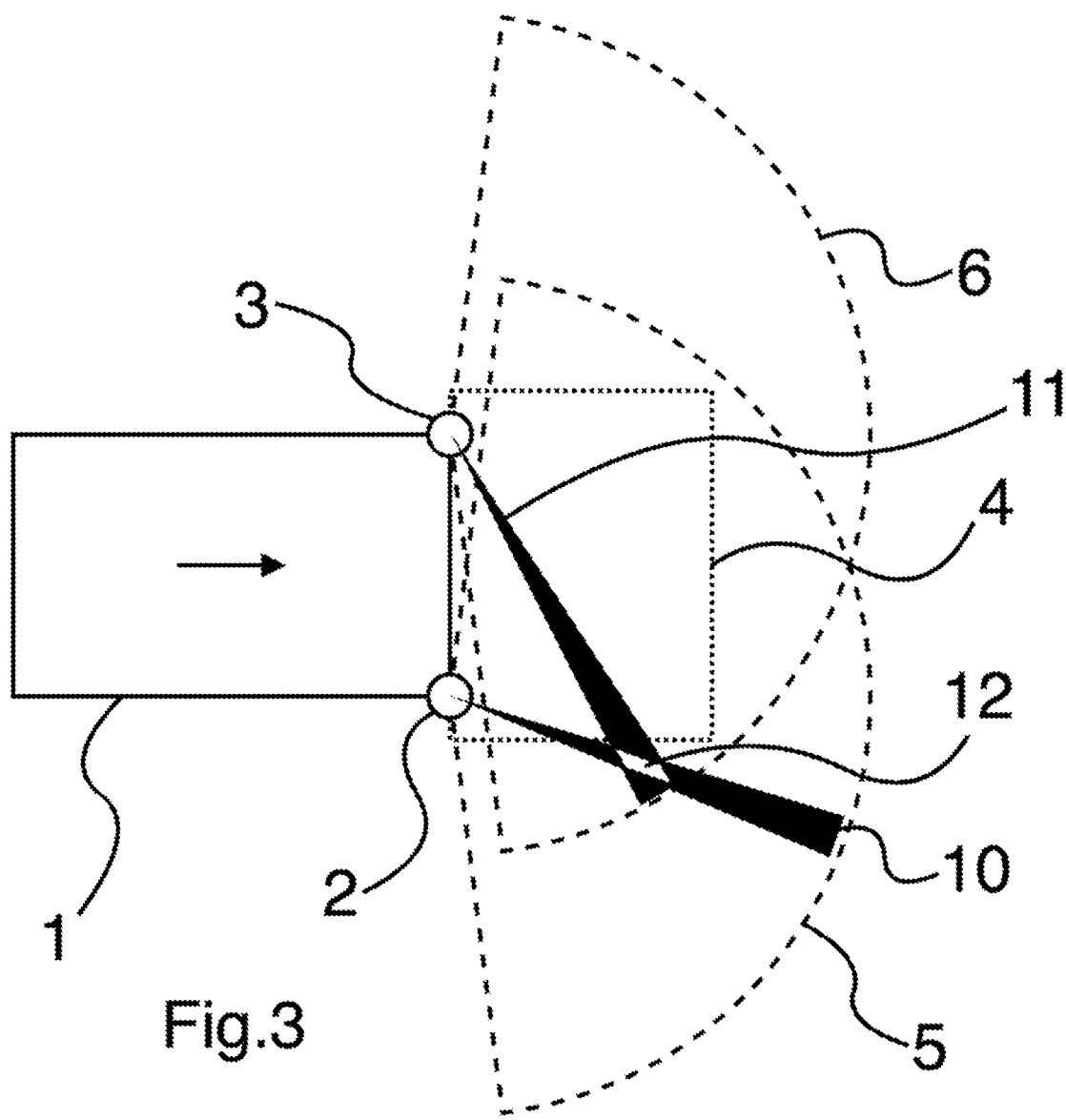
FIG. 3 illustrates the case of blind sectors overlapping outside of the monitored zone.

FIG. 3 illustrates the case of blind sectors overlapping outside of the monitored zone. Blind sectors 10 and 11 overlap in a region 12 that is located outside of monitored zone 4. The overlap is not instantly critical in the sense that the monitored zone is not currently affected, but it could become critical if and when the monitored zone 4 changes based on speed, steering and mechanical characteristics of the vehicle 1 (shape of the vehicle, maximal deceleration, brake reaction time . . . ) as well as latencies of software onboard vehicle 1. In this case, an alarm signal is sent to have to clean redundant sensors 2 and 3. The alarm signal could for example be sent to a remote operator of vehicle 1, in the case of an autonomous or driverless vehicle, or to the owner of vehicle 1, or to a facility in charge of maintenance of vehicle 1.

Figure 4:
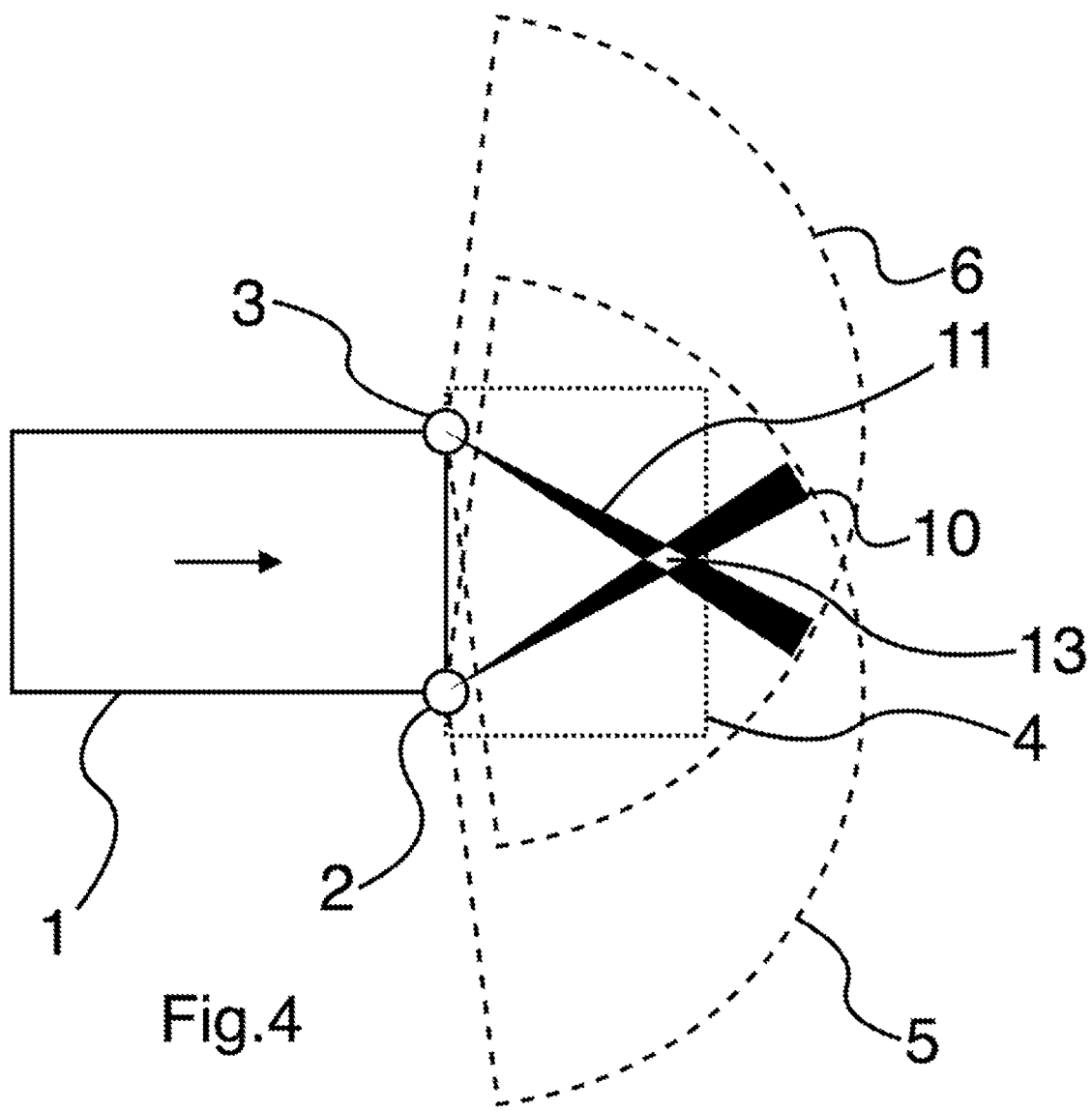
FIG. 4 illustrates the case of blind sectors overlapping within the monitored zone.

FIG. 4 illustrates the case of blind sectors overlapping within the monitored zone. Blind sectors 10 and 11 overlap in a region 13 that is located within the monitored zone 4. The overlap is critical in the sense that the monitored zone is affected and safety potentially compromised, as an obstacle might be hidden by the overlap of the two blind sectors 10 and 11. In this case, a critical signal is sent to the vehicle 1. As a result, action may be taken by the software onboard vehicle 1. For example, in the case of an autonomous or driverless vehicle, an emergency stop of the vehicle 1 may be triggered, or a change in its speed and/or steering may be triggered having as a result that the overlap between blind sectors 10 and 11 is kept outside of the monitored zone 4. Alternatively, a critical signal may be sent to the driver of vehicle 1, and/or cruise or auto control may be turned off, requiring immediate attention on the part of the driver.

We will now detail how blind sectors are calculated. Redundant sensors 2 and 3 each typically provides a cloud of points, with each point coming with 3D coordinates (such as X, Y and Z (Cartesian) or Rho, Theta and Phi (Spherical)) information within the sensor's reference system, representing essentially the distance (Rho) between the lightwave beam source and the object that reflected the beam, a horizontal angle (Theta) and a scanning layer angle (Phi) in the case of sensors with multiple scanning layers. Each cloud of points is thus representative of objects present in the field of view of each of redundant sensors 2 and 3.

Points with a distance (Rho) that is about, or in the same order of magnitude as, the distance between the lightwave beam source and the outer surface of the sensors' protective housing, are suspected to be indicative of the presence of obstructive elements that are in the vicinity of the redundant sensor's protective housing, and thus degrade the perception performances of the sensors, leading potentially to blind sector(s). Such points are called «abnormal points» hereafter. The distance between the lightwave beam source and the outer surface of the sensors' protective housing depends on the type of sensor and its characteristics, and as the case may be, on the protective elements of the vehicle around the sensor. Such a distance may for example be between 5 and 500 mm.

Figure 5:
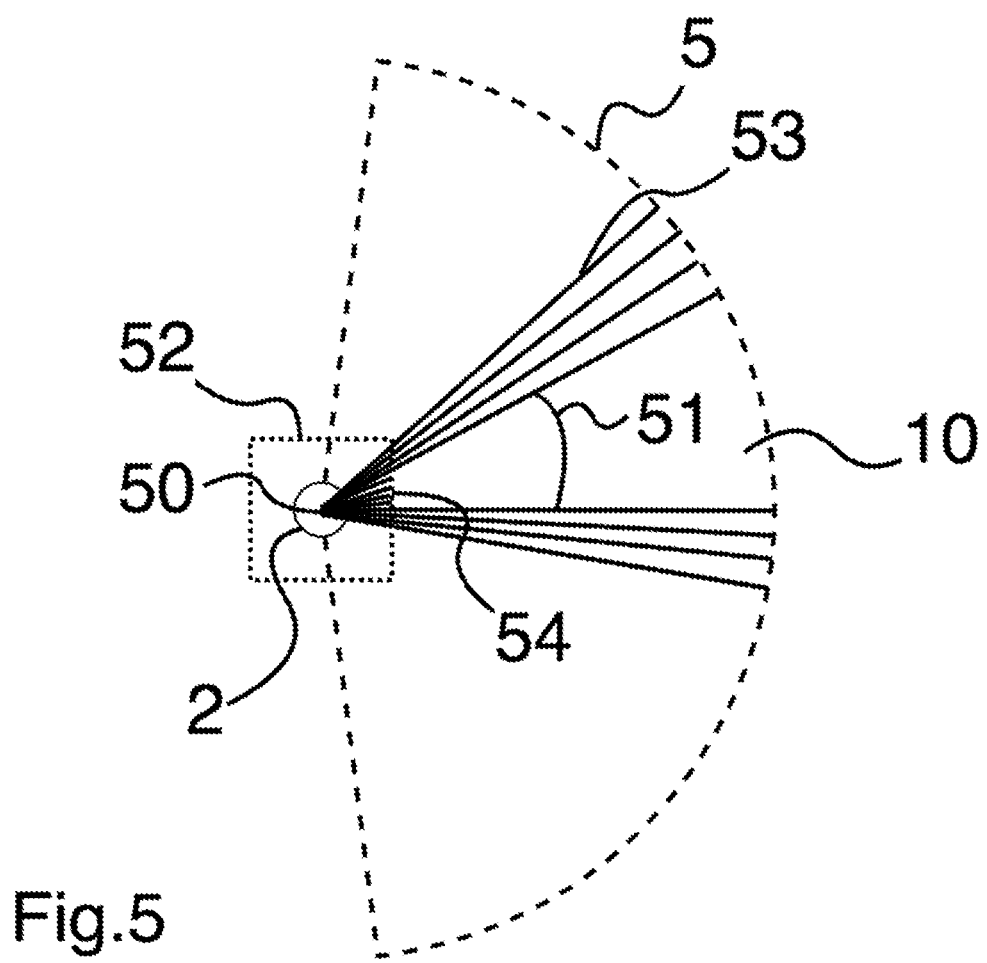
FIG. 5 illustrates an example of blind sector on one redundant sensor.

FIG. 5 illustrates an example of blind sector on one redundant sensor. The blind sector 10 is a slice in redundant sensor 2's horizontal field of view (or a orthogonal projection of the field of view on a substantially horizontal plane within the vehicle's reference system) with an angle 51 and a vertex 50 at, or about at, the lightwave beam source. Redundant sensor 2 emits successive lightwave beams 53 (a fraction of them only is represented) separated by small angles, for example 0.25 degree, to form the scanning layer 5, and provides a cloud of points as a measure of the length till each lightwave beam is being reflected by an object in the field of view. Abnormal points 54 are caused by the presence of obstructive elements in the vicinity of the protective housing of redundant sensor 2, shown here as including protective elements 52 of the vehicle 1.

At these abnormal points, the lightwave beams are reflected back at a distance which is about, or in the same order of magnitude as, the distance between the vertex 50 and the outer limits of the protective elements 52. If these abnormal points have a concentration or density that exceeds a first threshold, then a blind sector is detected.

The first threshold for the concentration or density of abnormal points (number of abnormal points per degrees (Theta)) is empirically determined based on a number of factors, including any or all of, without limitation: characteristics of the sensor such as wavelength, technology, resolution, etc., trade off between the level of safety and utilisation time of vehicle 1, the position of redundant sensors 2 and 3 on the vehicle 1 in particular relative to the road which is a source of obstructive elements such as water or dirt, the particular environment which vehicle 1 is routinely going to encounter, etc. For example, a blind sector may be considered formed with a first threshold having a value of between 1 and 2 points/degree. In this case, a warning signal may be sent to have to clean redundant sensor 2. The warning signal could for example be sent to a remote operator of vehicle 1, in the case of an autonomous or driverless vehicle, or to the owner of vehicle 1, or to a facility in charge of maintenance of vehicle 1.

The size of the angle 51 is determined by the size of the cloud of abnormal points. If the angle 51 is larger than a second threshold, then a «large blind sector» is considered to be formed. The second threshold is empirically determined based on a number of factors, including any or all of, without limitation: trade off between the level of safety and utilisation time of vehicle 1, the position of redundant sensors 2 and 3 on the vehicle 1 in particular relative to the road, the particular environment which vehicle 1 is routinely going to encounter, etc. For example a large blind sector may be considered formed with a second threshold having a value of between 2 and 8 degrees. In this case, an alarm signal, dedicated to redundant sensor 2, may be sent to have to clean redundant sensor 2. The alarm signal could for example be sent to a remote operator of vehicle 1, in the case of an autonomous or driverless vehicle, or to the owner of vehicle 1, or to a facility in charge of maintenance of vehicle 1. In this case, any overlapping region between large blind sector 10 and any large blind sector(s) of redundant sensor 3 is monitored.

Depending on the factors mentioned above, the first threshold and the second threshold for the angle 51 in redundant sensor 2 may be identical to, or different from, the first threshold and the second threshold used for the angle of blind sector(s) of redundant sensor 3. For example the first and second thresholds for redundant sensor 2 may respectively be 1.25 and 4 degrees, while the first and second thresholds for redundant sensor 3 may be 1 and 6 degrees.

We will now detail how the overlapping regions between large blind sectors, if any, are calculated, and it is determined whether or not any such overlapping regions lie within the monitored zone.

Any overlapping region between large blind sectors of redundant sensors is the geometrical intersection between the large blind sectors, ie the set of points that belong to all of these large blind sectors.

If there is a geometrical intersection between such overlapping regions and the monitored zone, then the situation is considered critical for a safe navigation of vehicle 1. In this case, a critical signal may be sent, resulting in emergency change in speed and/or steering, in the case of an autonomous or driverless vehicle, or immediate attention requested on the part of the driver.

Figure 7:
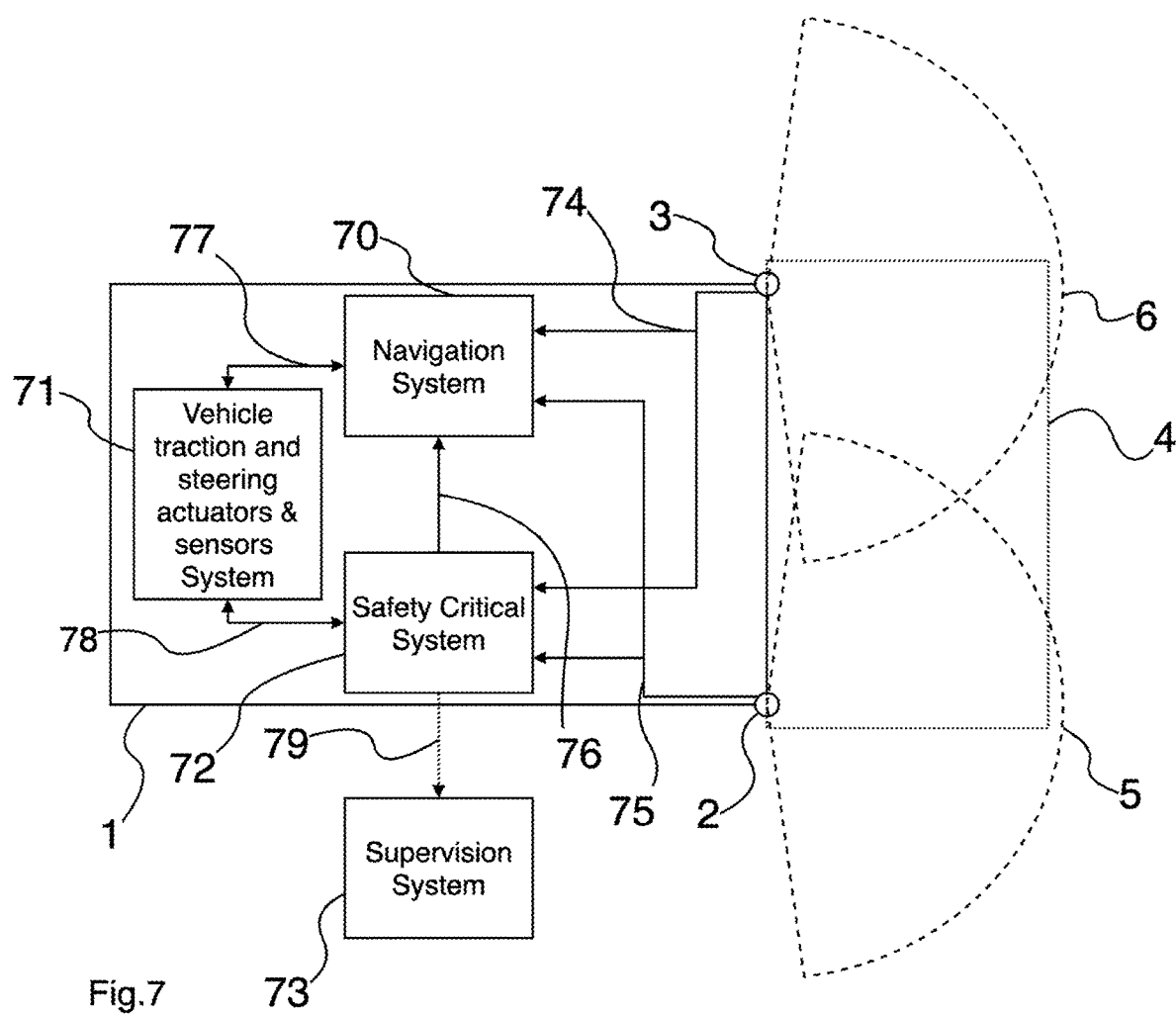
FIG. 7 is a block diagram showing the configuration in an embodiment of the invention for an autonomous or driverless vehicle.

FIG. 7 is a block diagram showing the configuration in an embodiment of the invention for an autonomous or driverless vehicle. Vehicle 1 is represented in a top view, equipped with two redundant sensors 2 and 3 having respective scanning layers 5 and 6. Redundant sensors 2 and 3 provide scanning information, including cloud of points information, respectively through data links 75 and 74, to a navigation system 70, and a safety critical system 72. The navigation system 70 exploits data received from redundant sensors 2 and 3 to make decisions regarding navigation of vehicle 1. Based on such decisions, navigation system 70 sends commands to, and receives feedback from, vehicle traction and steering actuators and sensors system 71, through data link 77.

The safety critical system 72 exploits data received from redundant sensors 2 and 3 to make decisions regarding navigation of vehicle 1 as they relate to blind sectors detected in the scanning layers 5 and 6 according to the invention. Based on such decisions, safety critical system 72 sends commands to, and receives feedback from, vehicle traction and steering actuators and sensors system 71, through data link 78. Any decision made by the safety critical system 72 is communicated to navigation system 70 through data link 76. Through data links 76 and 78, the decisions of safety critical system 72, as they relate to safety, prevail over those of navigation system 70, and the commands of safety critical system 72 to vehicle traction and steering actuators and sensors system 71 override those of navigation system 70.

One of the functions performed by the safety critical system 72 is that of calculation of the monitored zone 4 extending from vehicle 1. Alternatively, navigation system 70 may calculate the monitored zone 4, and feed that information to safety critical system 72, for example through data link 76 (not shown). In any case, safety critical system 72 makes the decision as to whether any overlap between any large blind sector of the scanning layer 5 of redundant sensor 2 and any large blind sector of the scanning layer 6 of redundant sensor 3, lies within the monitored zone 4.

In addition, navigation and state of vehicle 1 may be communicated to a remote supervision system 73 through a data link 7, which may take the form of an over-the-air data channel. Remote supervision system 73 can thus be informed including of decisions made by safety critical system 72, commands sent to vehicle traction and steering actuators and sensors system 71 as the case may be, and signals (warning, alarm, critical) if any sent by safety critical system 72.

In the case of a driven vehicle 1, the person skilled in the art will appreciate that navigation system 70 and supervision system 73 may perform differently, and that, although safety critical system 72 may make decisions and send signals according to the invention, in substantially the same manner as in the case of an autonomous or driverless vehicle, it may not have the same command control over vehicle traction and steering actuators and sensors system 71.

It will also be appreciated by the person skilled in the art that, although conceptually represented physically separated on FIG. 7, blocks represent functions which may be realized in single physical entities. Each block may comprise hardware and/or software and/or firmware (or a combination thereof), as is known in the art, to execute functions according to the invention, including the process described in relation to FIG. 6.

Figure 6:
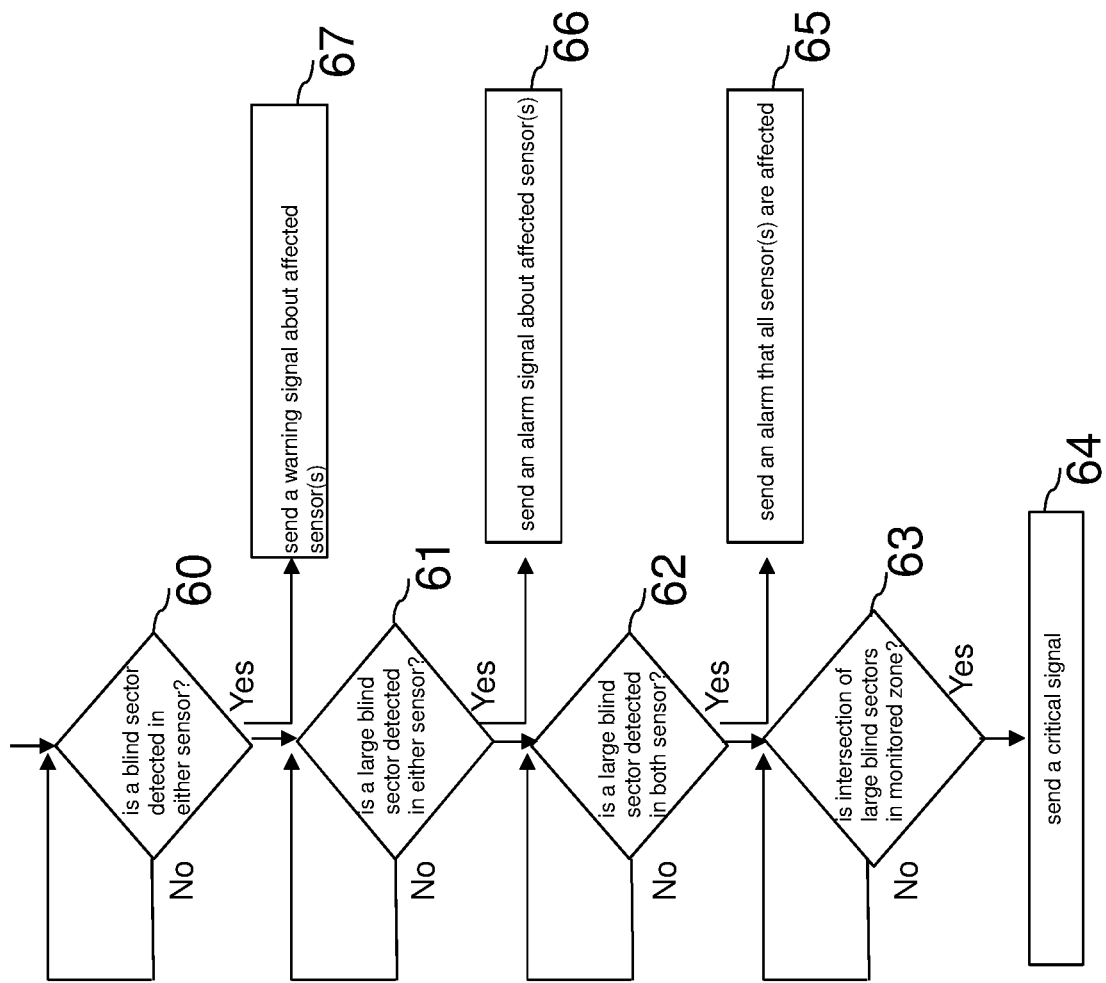
FIG. 6 is a flowchart illustrating a decision process according to the invention.

FIG. 6 is a flowchart illustrating a decision process according to the invention. It is applicable to all vehicles (autonomous or driverless or driven) in substantially the same manner, and is performed by the safety critical system 72. «Sensor» as shown in FIG. 6 is used as a substitute for «redundant sensor» as per the definition above.

At step 60 a check is made whether any of the sensors is affected by a blind sector. If it is, a warning signal is sent at step 67 about the affected sensor(s), and a branch is made to the next step. At step 61 a check is made whether any of the sensors si affected by a large blind sector. If it is, an alarm signal is sent at step 66 about the affected sensor(s), and a branch is made to the next step. At step 62 a check is made whether all of the sensors are affected by a large blind sector. If they are, an alarm signal is sent at step 65 that all sensors are affected, and a branch is made to the next step. At step 63 a check is made whether there is an overlap between any detected large blind sectors that lies within the monitored zone. If there is, a critical signal is sent at step 64 that safety of the vehicle's navigation is now compromised.

The person skilled in the art will appreciate that certain of the steps depicted in FIG. 6 may be omitted without departing from the scope of the invention in relation to safety and criticality when an overlap of large blind sectors lies within the monitored zone. For example, steps 65-67, as «intermediary» signals until a critical signal is sent, are optional. Also, step 60 of detection of blind sectors may be omitted with focus kept on the detection of large blind sectors. Finally steps 61 and 62 may be «merged» in one step only focusing on detecting a large blind sector in each one of the redundant sensors.

The invention has as an effect and result, including to extend as much as possible the utilisation time of the vehicle before safety is compromised. Indeed, the gradation of signals sent, if all performed, from warning signal, to alarm and critical signal, and/or the adjustment of first and/or second thresholds of detection of blind sectors and large blind sectors, allow to continue using the vehicle, knowing and managing the risks involved, until a truly critical situation arises which calls for a drastic measure (vehicle stop, or change in trajectory affecting the intersection of overlapping large sectors with the monitored zone, or critical signal to driver).

While the invention has been described in relation to two redundant sensors, it will be apparent to the person skilled in the art that its teaching applies equally when three or more redundant sensors are present on vehicle 1. In that case, the geometrical intersection between large blind sectors may be calculated taking into account all respective pairs of redundant sensors, or all redundant sectors simultaneously, or other combinations of multiples of redundant sensors. This allows for a granularity in the criticality of assessment of the situation: for example in the case of four redundant sensors, minimal criticality may be associated with only two redundant sensors having overlapping region(s) of large blind sectors in the monitored zone, and maximal criticality associated with all four redundant sensors sharing an overlapping region of large blind sectors in the monitored zone.

While the invention has been described in relation to redundant sensors, scanning fields and monitored zone being located at the front of the vehicle, relative to its motion direction, it will be apparent to the person skilled in the art that its teaching applies equally when such redundant sensors, scanning fields and monitored zone are located on the sides or the rear of the vehicle, relative to its motion direction.

While the invention has been described in relation to a vehicle moving in a substantially straight line trajectory, it will be apparent to the person skilled in the art that its teaching applies equally when the vehicle is engaging in a curve trajectory. The scanning fields of redundant sensors, or the monitored zone, may or may not be affected by such a change in trajectory, yet the principles described here of calculation of blind sectors, large blind sectors, overlapping regions between large blind sectors, and intersection with the monitored zone, continue to apply.

While the invention has been described in relation to redundant sensors having each one scanning layer, it will be apparent to the person skilled in the art that its teaching applies equally with redundant sensors having multiple scanning layers, such as, as commercially available, redundant sensors having a few scanning layers all extending from a single lightwave beam source, and giving such sensors a vertical field of view of a few degrees.

While the invention has been described in relation to redundant sensors having scanning layers in the same plane, it will be apparent to the person skilled in the art that its teaching applies equally with redundant sensors not having scanning layers in the same plane, or even scanning layers that are not parallel. In such cases, orthogonal projection on a two-dimensional horizontal plane within the vehicle's reference system may for example be used to continue applying the principles described here of calculation of blind sectors, large blind sectors, overlapping regions between large blind sectors, and intersection with the monitored zone.

The foregoing description is intended to be exemplary rather than limiting. The scope of the present technology is therefore intended to be limited solely by the scope of the appended claims.

The invention claimed is:

1. A method of handling blind sectors in scanning layers of a first redundant sensor and a second redundant sensor, the first and second redundant sensors being mounted on a vehicle from which a monitored zone extends, the first and second redundant sensors each providing a cloud of points representative of objects present in their respective fields of view, the method comprising:
   detecting formation of at least one large blind sector in the scanning layers of the first redundant sensor and detecting formation of at least one large blind sector in the scanning layers of the second redundant sensor;
   calculating an overlap between each detected large blind sector in any scanning layer of the first redundant sensor and each detected large blind sector in any scanning layer of the second redundant sensor; and
   if the overlap lies within the monitored zone, sending a critical signal to the vehicle.

2. The method of claim 1, in which detecting formation of at least one large blind sector in at least one of the scanning layers of the first and second redundant sensors comprises:
   detecting for each of the first and second redundant sensors that a density of abnormal cloud points exceeds a first threshold indicative of obstructive elements that are in the vicinity of a protective housing of at least one of the first redundant sensor or the second redundant sensor; and
   detecting for each of the first and second redundant sensors that an angle determined by the size of the cloud of abnormal cloud points exceeds a second threshold.

3. The method of claim 1, further comprising, upon receiving the critical signal, stopping the vehicle in emergency.

4. The method of claim 1, further comprising, upon receiving the critical signal, changing at least one of a speed or a steering of the vehicle so as to remove the overlap from the monitored zone.

5. The method of claim 1, further comprising, upon receiving the critical signal, sending a signal to a driver of the vehicle requiring immediate attention.

6. The method of claim 1, in which scanning layers of the first and second redundant sensors are not in a same plane, or are not parallel, and calculating the overlap between each detected large blind sector in any scanning layer of the first redundant sensor and each detected large blind sector in any scanning layer of the second redundant sensor further includes prior orthogonally projecting scanning layers on a substantially horizontal plane within a vehicle's reference system.

7. The method of claim 1, in which n redundant sensors are mounted on the vehicle, with n being equal or superior to 3, and calculating the overlap is performed simultaneously for all n redundant sensors.

8. The method of claim 2, in which the at least one of the first threshold or the second threshold are adapted to each one of the first and second redundant sensors.

9. The method of claim 2, in which scanning layers of the first and second redundant sensors are not in a same plane, or are not parallel, and calculating the overlap between each detected large blind sector in any scanning layer of the first redundant sensor and each detected large blind sector in any scanning layer of the second redundant sensor further includes prior orthogonally projecting scanning layers on a substantially horizontal plane within a vehicle's reference system.

10. The method of claim 2, in which n redundant sensors are mounted on the vehicle, with n being equal or superior to 3, and calculating the overlap is performed simultaneously for all n redundant sensors.

11. A system for handling blind sectors in scanning layers of a first redundant sensor and a second redundant sensor mounted on a vehicle, comprising:
   a safety critical system configured to:
      receive, from each of the first and second redundant sensors, a cloud of points representative of objects present in their respective fields of view;
      detect formation of at least one large blind sector in the scanning layers of the first redundant sensor and detecting formation of at least one large blind sector in the scanning layers of the second redundant sensors;
      calculate an overlap between each detected large blind sector in any scanning layer of the first redundant sensor and each detected large blind sector in any scanning layer of the second redundant sensor; and
      if the overlap lies within a monitored zone extending from the vehicle, send a critical signal to the vehicle.

12. The system of claim 11, in which the safety critical system is further configured to:
   detect, for each of the first and second redundant sensors, a density of abnormal cloud points above a first threshold indicative of obstructive elements that are in a vicinity of a protective housing of at least one of the first redundant sensor or the second redundant sensor; and
   detect, for each of the first and second redundant sensors, that an angle determined by a size of the cloud of abnormal cloud points exceeds a second threshold.

13. The system of claim 11, further comprising a vehicle traction and steering actuators and sensors system configured to, upon receiving the critical signal, stop the vehicle in emergency.

14. The system of claim 11, further comprising a vehicle traction and steering actuators and sensors system configured to, upon receiving the critical signal, change at least one of a speed or a steering of the vehicle so as to remove the overlap from the monitored zone.

15. The system of claim 11, in which the safety critical system is further configured to, when scanning layers of the first and second redundant sensors are not in a same plane, or are not parallel, orthogonally project scanning layers on a substantially horizontal plane within a vehicle's reference system, prior to calculating an overlap between each detected large blind sector in any scanning layer of the first redundant sensor and each detected large blind sector in any scanning layer of the second redundant sensor.

16. The system of claim 11, in which:
   n redundant sensors are mounted on the vehicle, with n being equal or superior to 3; and
   the safety critical system is further configured to calculate the overlap simultaneously for all n redundant sensors.

17. The system of claim 11, in which the safety critical system is further configured to calculate the monitored zone extending from the vehicle.

18. The system of claim 12, in which the at least one of the first threshold or the second threshold are adapted to each one of the first and second redundant sensors.

\* \* \* \* \*